(12) United States Patent
Inoue

(10) Patent No.: US 7,040,025 B2
(45) Date of Patent: May 9, 2006

(54) DEVICE AND METHOD OF DETECTING ROTATION ANGLE

(75) Inventor: Makoto Inoue, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/515,595

(22) PCT Filed: Nov. 21, 2003

(86) PCT No.: PCT/JP03/14872

§ 371 (c)(1),
(2), (4) Date: Nov. 24, 2004

(87) PCT Pub. No.: WO2004/048899

PCT Pub. Date: Jun. 10, 2004

(65) Prior Publication Data

US 2005/0217126 A1    Oct. 6, 2005

(30) Foreign Application Priority Data

Nov. 25, 2002  (JP) .............................. 2002-340593

(51) Int. Cl.
   *G01B 7/30*  (2006.01)
(52) U.S. Cl. ........................ 33/1 PT; 33/600
(58) Field of Classification Search ............ 33/1 N, 33/1 PT, 501.7, 534, 600
   See application file for complete search history.

(56) References Cited

U.S. PATENT DOCUMENTS

| | | | |
|---|---|---|---|
| 5,930,905 A * | 8/1999 | Zabler et al. ............... | 33/1 PT |
| 6,019,086 A | 2/2000 | Schneider et al. | |
| 6,341,426 B1 * | 1/2002 | Okumura ..................... | 33/1 N |
| 6,848,187 B1 * | 2/2005 | Ito et al. ..................... | 33/1 PT |
| 6,861,837 B1 * | 3/2005 | Shimizu et al. ............. | 33/1 PT |
| 2003/0088989 A1 * | 5/2003 | Nishikawa et al. ......... | 33/1 PT |
| 2003/0177649 A1 * | 9/2003 | Ito et al. ..................... | 33/1 PT |
| 2004/0244210 A1 * | 12/2004 | Harrer ........................ | 33/1 PT |

FOREIGN PATENT DOCUMENTS

| | | |
|---|---|---|
| EP | 0 602 479 | 6/1994 |
| EP | 1 225 419 | 7/2002 |
| WO | 96/27116 | 9/1996 |

* cited by examiner

*Primary Examiner*—G. Bradley Bennett
(74) *Attorney, Agent, or Firm*—Wenderoth, Lind & Ponack, L.L.P.

(57) ABSTRACT

A rotation-angle detecting device contains two rotators having the same number of teeth, which engage with a gear fixed to a rotation-detecting axle as a detected object. The detecting device further includes a controller. Receiving a rotation-angle signal from the rotators, the controller amplifies the signal, performs calculations, and stores the results. The controller converts each rotation-angle signal from each rotator into each periodic waveform output having the same crest value, and stores an initial phase difference value at initial setting. In driving operations, monitoring an evaluation value calculated with reference to the initial phase difference value, the controller determines that abnormalities occurred, if the evaluation value exceeds a predetermined abnormality-evaluation threshold.

12 Claims, 9 Drawing Sheets

FIG. 9 – PRIOR ART
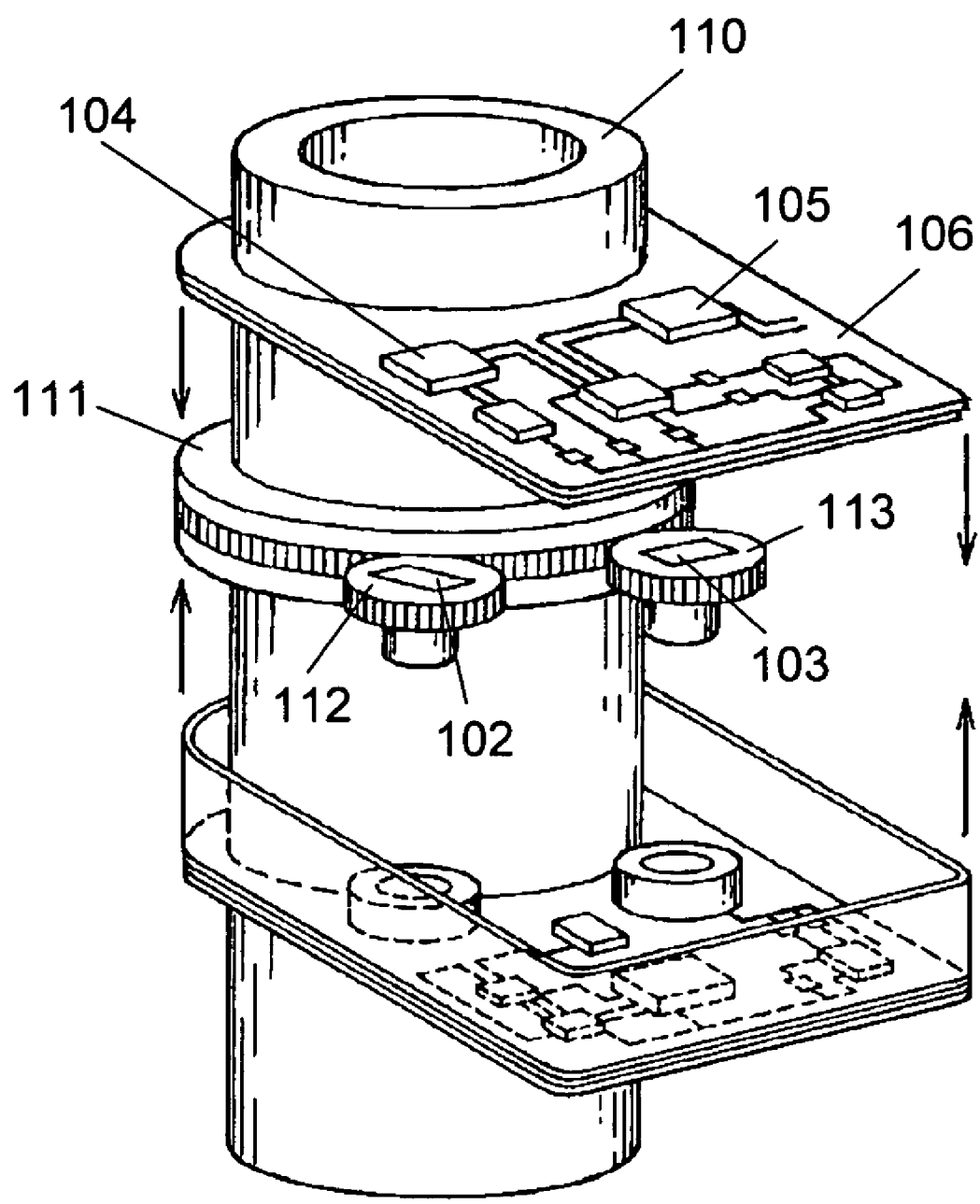

FIG. 10 – PRIOR ART
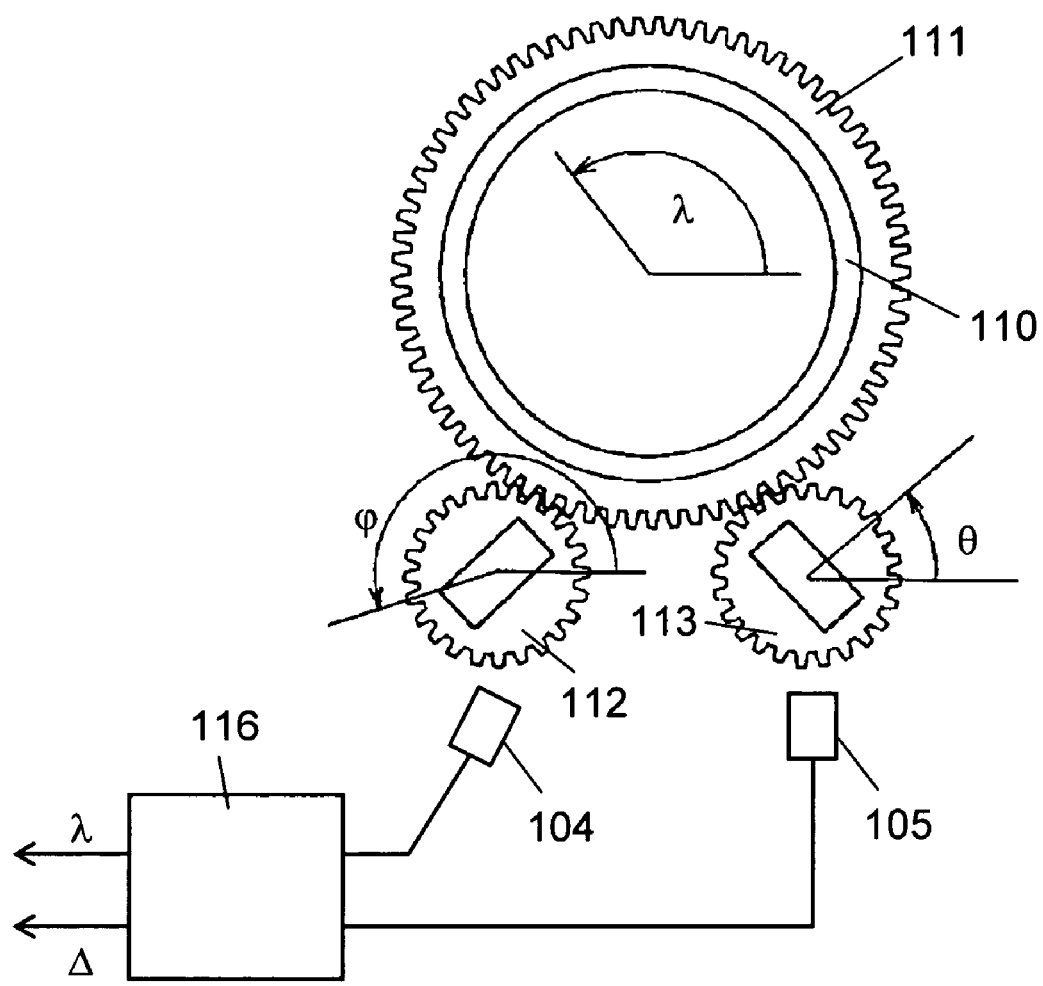

DEVICE AND METHOD OF DETECTING ROTATION ANGLE

This application is a U.S. national phase application of PCT International Application PCT/JP03/14872.

TECHNICAL FIELD

The present invention relates to a rotation-angle detecting device employed, for example, for a vehicle control system in an automobile and a rotation-angle detecting method using the device.

BACKGROUND ART

A rotation-angle detecting device has conventionally been employed for detecting a rotation angle of a rotator, for example, a steering wheel on an automobile that rotates beyond 360° (in a predetermined rotation range). FIGS. 9 and 10 show such a prior-art device and method of detecting rotating angle. For example, WO 96/27116 is a well-known disclosure introducing the prior-art. Firstly, the device and method of the prior-art will be described hereinafter.

FIG. 9 shows the general structure of a rotation-angle detecting device. Gear 111 is coupled with steering axle (hereinafter referred as to a rotation axle) 110 of an automobile. Two gears 112 and 113 are positioned on gear 111 so as to engage therewith. Gears 112 and 113 have permanent magnets 102 and 103, respectively. Furthermore, magnetometric sensors 104 and 105 are disposed so as to face magnets 102 and 103, respectively. Sensors 104 and 105 are arranged, together with other electric components, on circuit board 106.

FIG. 10 schematically shows the relationship between the aforementioned three gears. Rotation detecting axle 110, which rotates beyond 360°, has gear 111. Gear 111 has n teeth. On the other hand, gears 112 and 113 engaging with gear 111 have m teeth, and m+1 teeth, respectively. Sensor 104 periodically detects rotation angle $\psi$ of gear 112. Similarly, sensor 105 detects rotation angle $\theta$ of gear 113. Although the periodicity of each sensor (represented by $\Omega$) is usually determined 180° or 360°, it is not limited thereto.

Each sensor is connected to electronic evaluation device 116, which performs calculations required for detecting angle $\lambda$ of rotation axle 110. On the precondition that each of sensors 104 and 105 is defined as "an absolute-value sensor", the two sensors detect angle $\psi$ of gear 112 and angle $\theta$ of gear 113, immediately after the rotation-angle detecting device is turned ON. The sensors thus outputs angles $\psi$ and $\theta$ at a turned-on moment. Prior to the calculation of angle $\lambda$ of rotation axle 110, integer number "k" is obtained from the expression below by substituting angles $\psi$, $\theta$, the number of teeth of gears 112, 113, and $\Omega$:

$$k = ((m+1) \cdot \theta - m \cdot \psi)/\Omega.$$

And further, with the integer number k and the number of teeth of rotation detecting axle 111, angle $\lambda$ is derived from the expression below:

$$\lambda = (m \cdot \psi + (m+1) \cdot \theta - (2m+1) \cdot k \cdot \Omega)/2n.$$

The aforementioned detecting device, however, receives a signal without evaluating, even if the sensors have an abnormal output. Therefore, a perceptible error can occur in measurement. Besides, the detecting device employs an amplifying circuit to amplify a low-powered output from the sensors. If the amplifying circuit improperly amplifies the signal from the sensors, the result will be the same. Such an error in measurement has often invited a problem that the rotation of the steering wheel cannot be accurately transmitted to the vehicle control system of a car. The present invention addresses the problem above. It is therefore the object to provide a rotation-angle detecting device capable of quickly detecting abnormalities occurring in the detector for detecting a rotation angle and in the amplifying circuit for amplifying the signal from the detector.

SUMMARY OF THE INVENTION

The present invention addresses the aforementioned problem. It is therefore an object to provide a simply structured rotation-angle detecting device capable of quickly detecting abnormalities in a rotator, a detector, and an amplifier. The rotation-angle detecting device of the present invention, which detects a rotation angle of a rotation detecting axle, has an abnormality evaluation mechanism. The mechanism further contains i) a first rotator and a second rotator, both of which have the same number of teeth and engage with the gear fixed on the rotation detecting axle; ii) a first angle-detector and a second angle-detector that detect the rotation angle of the first rotator and the second rotator, respectively; and iii) a controller for calculating the output fed from the first and second detectors and storing the calculation result. The controller i) converts the output from the first and the second detectors into a first periodic waveform and a second periodic waveform, respectively, both of which have the same crest value and then ii) stores a phase difference between the first and second periodic waveforms at a time of initial setting as an initial phase difference. The controller determines that an abnormal condition occurs when an evaluation value calculated with reference to the initial phase difference exceeds a threshold value for abnormality evaluation.

The present invention also relates to a method of detecting rotation angle using the detecting device above.

BRIEF DESCRIPTION OF THE DRAWINGS

FIG. 9 shows the structure of a prior-art rotation-angle detecting device.

FIG. 10 is schematic view of illustrating the structure of a prior-art rotation-angle detecting device.

DETAILED DESCRIPTION OF THE INVENTION

The exemplary embodiments of the present invention are described hereinafter with reference to the accompanying drawings.

FIRST EXEMPLARY EMBODIMENT

Figure 1:
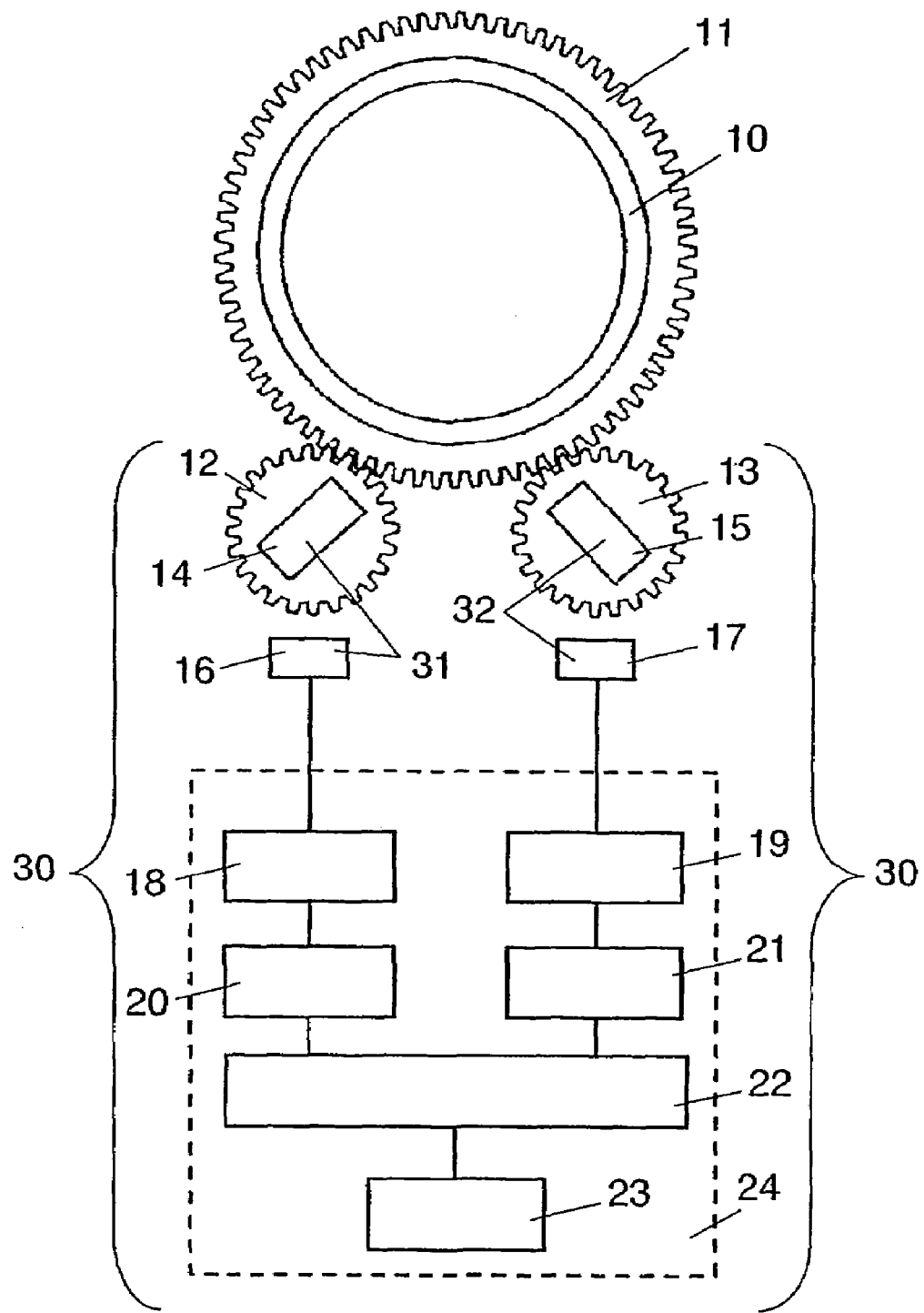
FIG. 1 illustrates the structure of a rotation-angle detecting device in accordance with a first exemplary embodiment of the present invention.

FIG. 1 shows the entire structure of the detecting device of the present invention. In FIG. 1, gear 11 of "n" number of teeth is attached with rotation detecting axle 10 of the steering wheel of a car (hereinafter referred to as rotation detecting axle 10). Further, a first rotator 12 and a second rotator 13, each of which has a gear around the periphery, are arranged so as to engage with the gear 11 of rotation detecting axle 10. The first gear 12 and the second gear 13 have the same number of teeth, "m". Rotators 12 and 13 also have permanent magnets 14 and 15, respectively. Furthermore, magnetometric sensors 16 and 17 are disposed so as to face magnets 14 and 15, respectively. The permanent magnet 14 and the magnetometric sensor 16 constitute the first rotation-angle detecting device 31. The permanent magnet 15 and the magnetometric sensor 17 constitute the second rotation-angle detecting device 32. Signals fed from sensors 16 and 17 are amplified by amplifiers 18 and 19, and then processed by waveform processors 20 and 21, respectively. Calculator 22 performs various calculations on the data fed from processors 20 and 21. Storage 23 stores calculation results necessary for rotation-angle detecting.

The amplifier, waveform processor, calculator, and storage above are mounted, as the CPU (central processing unit) or an IC (integrated circuit), on a printed circuit board (not shown). These components constitute controller 24. Although magnetometric sonsors 16 and 17 employ AMR (anisotropic magnetic resistance) elements in the embodiment, it is not limited thereto. A magnetometric sensor employing Hall elements can be structured the same. An abnormality evaluation mechanism 30 includes the first rotator 12, the second rotator 13, the first rotation-angle detecting device 31, the second rotation-angle detecting device 32, and the controller 24.

Figure 2:
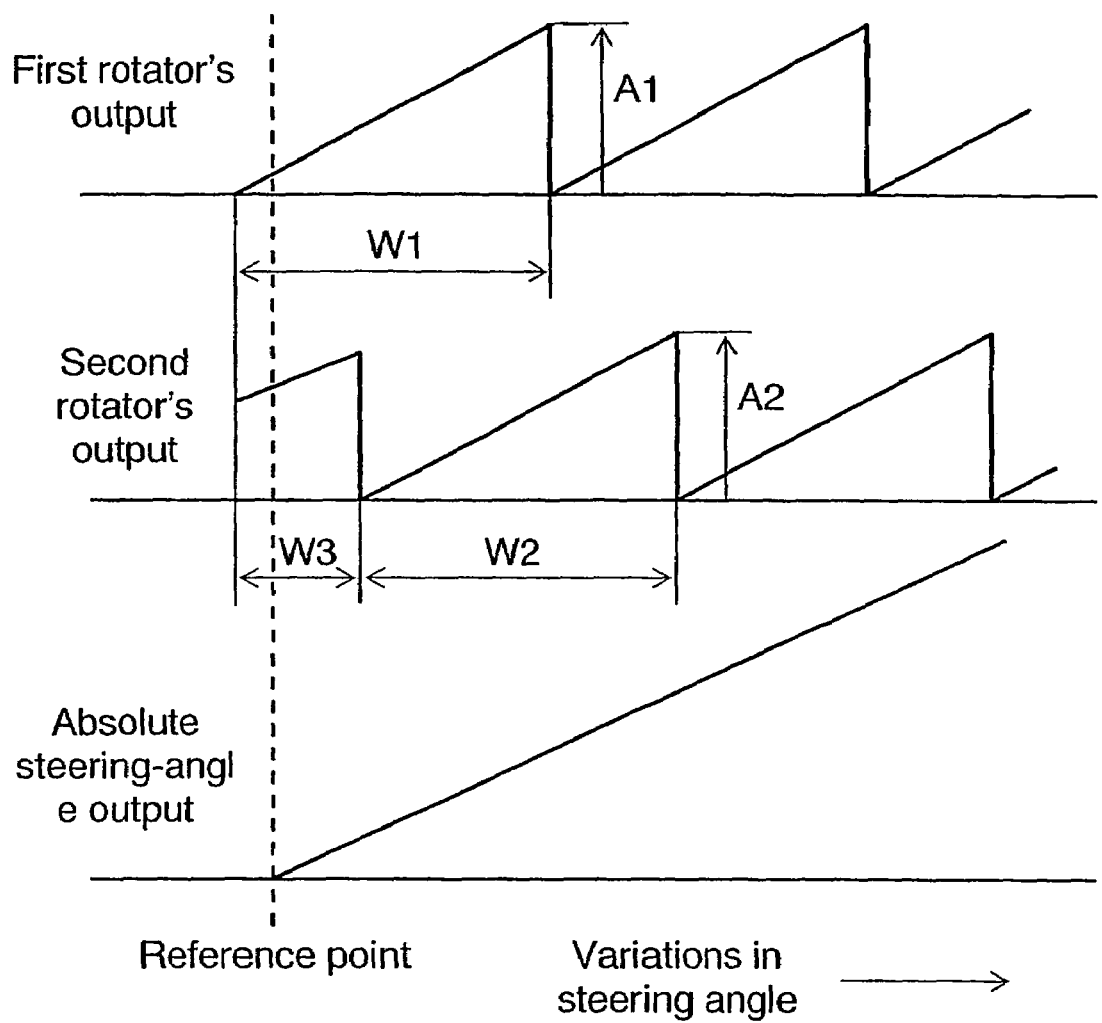
FIG. 2 illustrates the output of the rotators of the device of the first embodiment.

FIG. 2 shows each output of the first rotator and the second rotator and an output of absolute steering angle after subjected to waveform processing. The signal fed from sensors 16 and 17 has the form of a sinusoidal curve. Processed by waveform processors 20 and 21, the signal is formed into a waveform that periodically changes almost linearly (hereinafter referred to as a saw-tooth wave).

When "k" takes the gear ratio of gear 11 of the rotation detecting axle and first rotator 12 (or second rotator 13), "k" is obtained by the expression: $k=n/m$. And further, the wave period of the first rotator's output and the wave period of the second rotator's output take the same value. Suppose that "w" takes the wave period of the two rotators' output. The "w" is given by the expression: $w=360/2k$. This is due to the characteristics of a magnetometric sensor employing the AMR elements—the sensor outputs two-cycle waveform per rotation of a rotator because the sensor does not discriminate between the two poles (i.e., N and S) of the permanent magnet. When $k=3$, i.e., first rotator 12 and second rotator 13 rotate three times faster than rotation detecting axle 10, the period "w" is given the value of 60° from the expression above. Suppose that the phase difference between the first rotator's output and the second rotator's output is represented by "w3". The value "w3" depends on the positional relation between permanent magnets 14, 15 and magnetometric sensors 16, 17. The measurement method will be described later.

The first rotator's output and the second rotator's output have the same crest value (A1, A2). Suppose that the crest value A1, A2 of the saw-tooth wave obtained from the two rotators' output is represented by "A". The crest value A is obtained by converting the angle of the period w of each rotator's output into rotation angle of the rotation detecting axle 10.

A linear waveform (hereinafter referred to as an absolute steering-angle output) shown in FIG. 2, which is given by processing the two rotators' output, represents the steering angle of rotation detecting axle 10.

Figure 3:
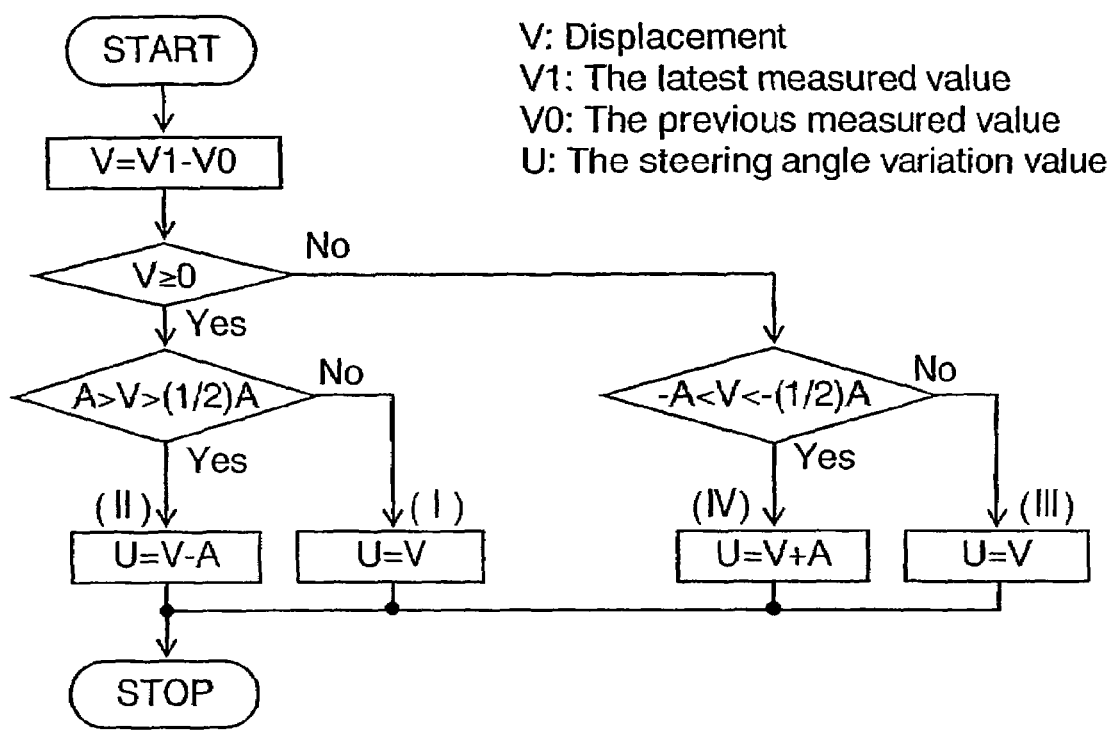
FIG. 3 is a flow chart illustrating the calculation of a steering angle performed in the device of the first embodiment.
Figure 4:
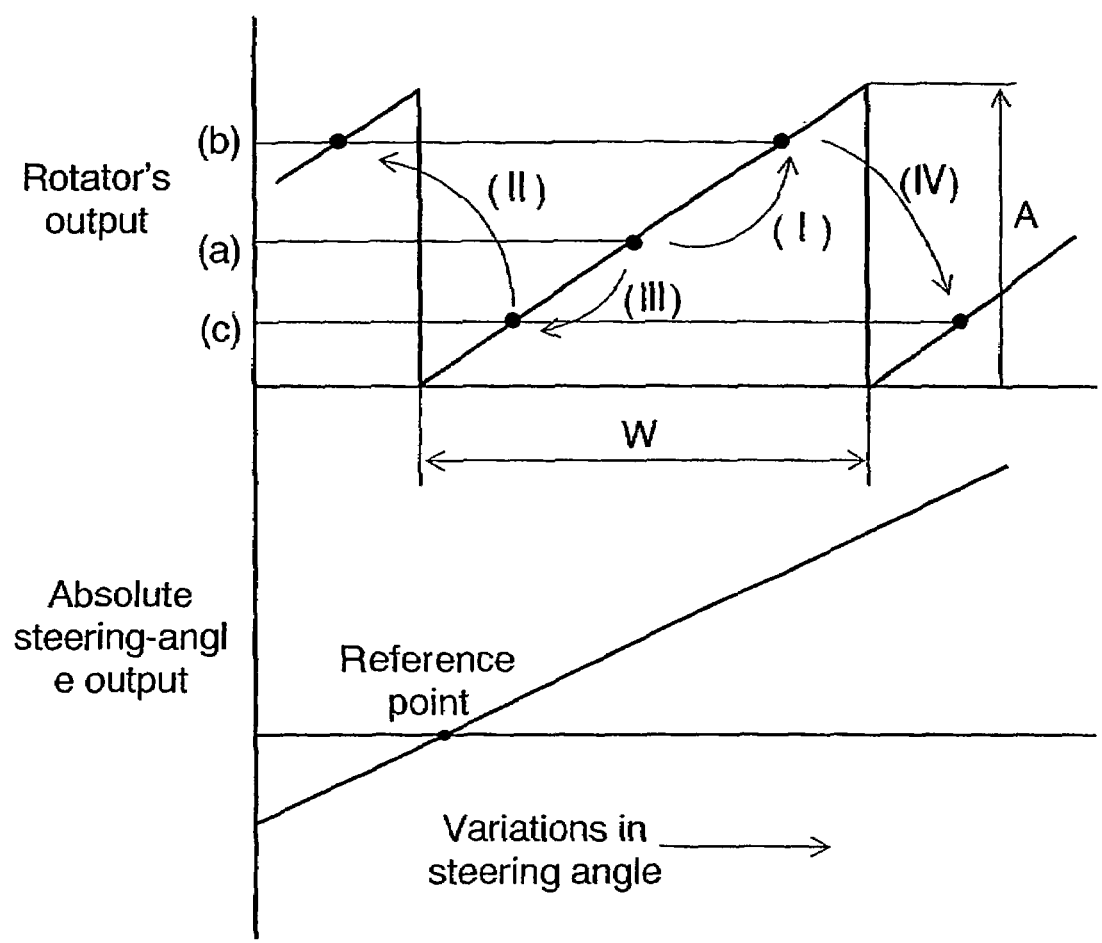
FIG. 4 illustrates the rotators' output and absolute steering-angle output.

FIG. 3 is a flow chart illustrating the calculation of the absolute steering-angle output. FIG. 4 illustrates the waveform of the rotators' output. Hereinafter will be described the calculation method with reference to both figures. When the latest measured value "V1" and the previous measured value "V0" of the rotator's output are obtained by sampling the output every short period, for example, every 1 millisecond, the displacement "V" can be obtained by the expression: $V=V1-V0$. Adding the displacement V to the previously calculated steering-angle value provides the latest steering angle value. As a presumption, the displacement in the steering angle between the previous measured value and the latest measured value is supposed to be less than $(½)w$. There is no chance to have such a large displacement exceeding the value of $(½)w$ in the aforementioned short sampling intervals. The procedure of calculating displacement in the steering-angle has four branches (i) through (iv), as shown in the flow chart of FIG. 3, according to the displacement value V. It will be understood that the numbers of (i) through (iv) commonly used in FIGS. 3 and 4 are associated with each other. The explanation below will be given on the precondition of: $((b)-(a))<(½)A$, $((a)-(c))<(½)A$, and $((b)-(c))>(½)A$.

Case (i)

Referring to FIG. 3, when V0 (i.e., the previous value) measures level (a), and V1 (i.e., the latest value) measures level (b), the displacement V satisfies $V \geq 0$ from the calculation of $V=V1-V0$. In the next step of the flow chart, the displacement V does not meet the condition of $A>V>(½)A$. In this case, the steering-angle variation value "U" is calculated from the expression: $U=V$. That is, the value of $((b)-(a))$ is added to the previous measured steering-angle value. In this case, the device determines that the displacement occurs in a "forward" direction of the steering angle, as indicated by arrow (i) in FIG. 4.

Case (ii)

Referring to FIG. 3, when V0 measures level (c), and V1 measures level (b), the displacement V satisfies $V \geq 0$. In the next step of the flow chart, the displacement V meets the condition of $A>V>(½)A$. In the following step, the steering-angle variation value U is calculated from the expression: $U=V-A$. That is, the value of $((b)-(a)-A)$ is added to the previous measured steering-angle value. In this case, the device determines that the displacement occurs in a "backward" direction of the steering angle, as indicated by arrow (ii) in FIG. 4.

Case (iii)

Referring to FIG. 3, when V0 measures level (a), and V1 measures level (c), the displacement V does not satisfy $V \geq 0$. In the next step of the flow chart, the displacement V does not meet the condition of $(-A)<V<(-½)A$. In this case, the steering-angle variation value U is calculated from the expression: $U=V$ That is, the value of $((c)-(a))$ is added to the previous measured steering-angle value. In this case, the device determines that the displacement occurs in a backward direction of the steering angle, as indicated by arrow (iii) in FIG. 4.

Case (iv)

Referring to FIG. 3, when V0 measures level (b), and V1 measures level (c), the displacement V does not satisfy V≧0. In the next step of the flow chart, the displacement V meets the condition of $(-A)<V<(-\frac{1}{2})$ A. Therefore, in the following step, the steering-angle variation value U is calculated from the expression: U=V+A. That is, the value of ((c)−(b)+A) is added to the previous measured steering-angle value. In this case, the device determines that the displacement occurs in a forward direction of the steering angle, as indicated by arrow (iv) in FIG. 4.

Through the calculations above, calculator 22 shown in FIG. 1 obtains a linear output waveform of the absolute steering angle from the saw-tooth waveform received from the rotators. In the calculation, calculator 22 recognizes the reference point of the absolute steering-angle output by a neutral position signal of the steering wheel, which is fed from the car body. It is thus possible to provide a rotation-angle detecting device that converts the movement beyond 360° of rotation of the steering wheel into a linear absolute steering-angle output.

Figure 5:
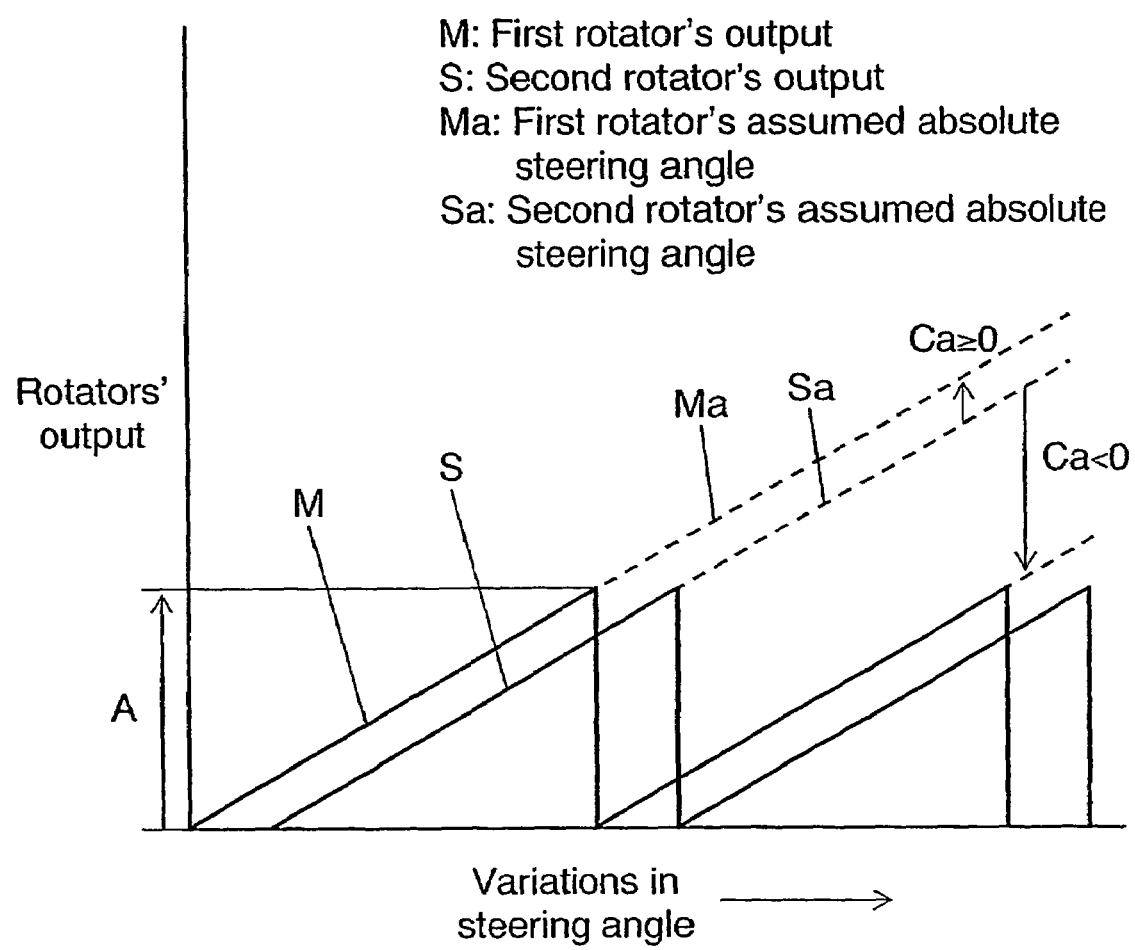
FIG. 5 is a view illustrating an initial phase difference obtained from the output of two rotators.

FIG. 5 illustrates an initial phase difference in rotation angle between the two rotators' output. Through the aforementioned calculation, a linear waveform of absolute steering-angle output can be obtained from the rotators' output. In this calculation, with no adjustment of the reference point brought by the neutral position signal, the assumed absolute steering-angle of the first rotator (represented by "Ma") is obtained from the first rotator's output "M"; similarly, the assumed absolute steering-angle of the second rotator (represented by "Sa") is obtained from the second rotator's output "S". To obtain the values Ma and Sa, the measurement, in which rotation detecting axle 10 is rotated so as to have nearly one full-turn, is repeated several times. Now suppose that the measurement is repeated "i" times. Each time the measurement is done, the assumed absolute steering-angle of the first rotator's output (represented by "Mi") and the assumed absolute steering-angle of the second rotator's output (represented by "Si") are obtained to calculate the average value "Ca" of the difference between Mi and Si:

$$Ca=(Mi-Si)/i \quad (1).$$

According to the value Ca, the initial phase difference (value) "C" is determined as follows:

$$\text{If } Ca \geq 0, C=Ca \quad (2),$$

$$\text{Otherwise, i.e., if } C<0, C=Ca+A \quad (3).$$

The process above determines the setting range of the value C: $0 \leq C \leq A$. The initial phase difference C above is stored in storage 24. Monitoring changes in the value C stored in storage 24, the detector finds abnormalities in driving operations.

Next will be described a method of detecting abnormalities caused by components, such as a worn-out and degraded gear, or a malfunction occurring in a magnetometric sensor, amplifier, or waveform processor. In the method, the device detects abnormalities with reference to the initial phase difference C as a reference value.

Figure 6:
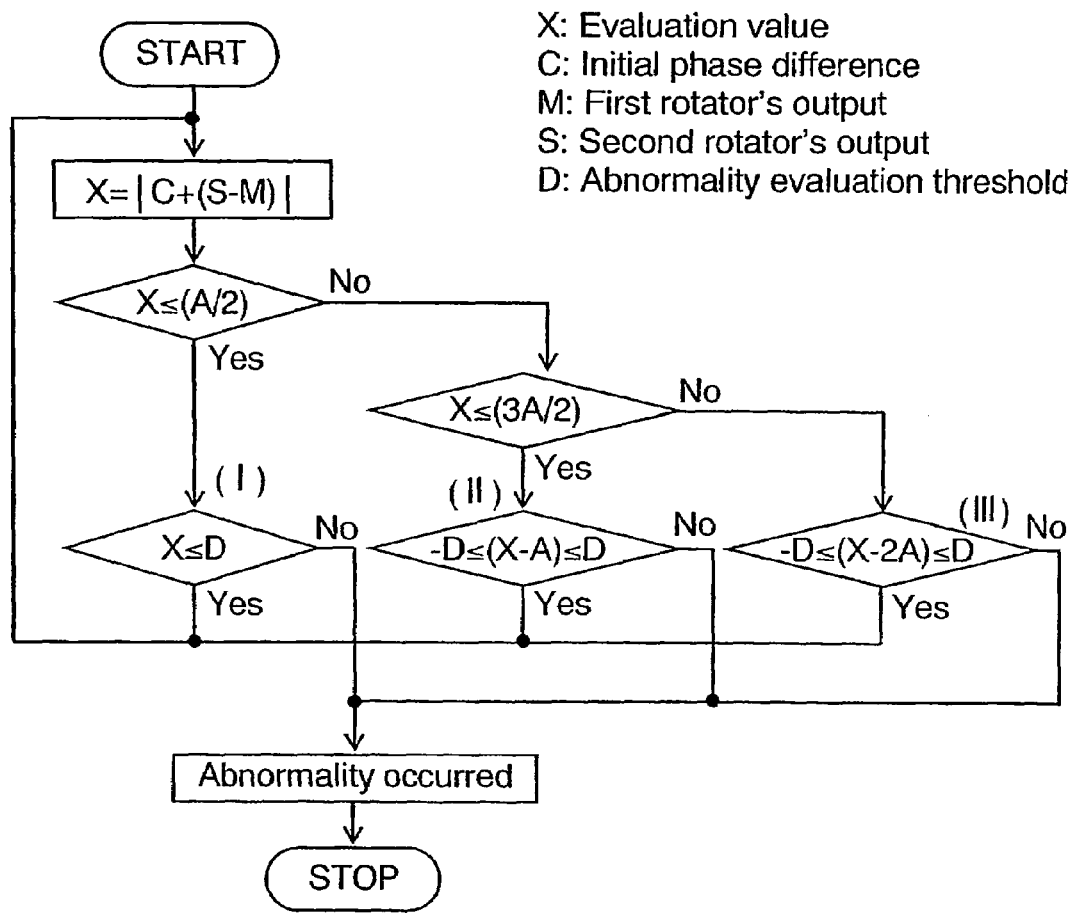
FIG. 6 is a flow chart illustrating the abnormality evaluation procedure.

FIG. 6 is a flow chart showing the procedures of detecting abnormalities. In FIG. 6, "M" represents the first rotator's output; "S" represents the second rotator's output; "C" represents the initial phase difference calculated by the aforementioned expressions (1) through (3); and "A" represents the crest value of a saw-tooth wave described above. When "X" denotes that an abnormality occurs or not, the evaluation value X can be derived from the expression below:

$$X=|C+(S-M)| \quad (4).$$

In the expression, the value of (S−M) takes a range of ±A, and therefore, $0 \leq X \leq 2A$. As described above, the initial phase difference C is stored in storage 23. The detector compares the initial value C with the value of (S−M) measured in driving operations. If the difference between the two values exceeds a predetermined threshold (represented by "D"), the device detects abnormalities. Prior to the measurement, the threshold D has a small value that has no ill effect on steering operation in driving (for example, 3 to 5 degrees).

In the flow chart, the procedure is divided into three branches (i) through (iii), according to the evaluation value X obtained from expression (4).

Case (i)

In this case, the evaluation value X satisfies $X \leq (A/2)$. In the next step, the evaluation value X is compared with the predetermined threshold D. If $X \leq D$, the system determines that no abnormality occurred, and the procedure goes back to the step previous to next sampling; otherwise, the system judges an abnormal condition occurred in the device, and terminates the program. In this case, measures should be taken to recover the abnormal condition (not shown).

Case (ii)

The evaluation value X does not satisfy $X \leq (A/2)$ but does satisfy $X \leq (3A/2)$. In this case, the value in which the crest value A is subtracted from the evaluation value X, i.e., the value of (X−A) is employed for the evaluation value. If the evaluation value satisfies $-D \leq (X-A) \leq D$, the system judges that no abnormality occurred; and otherwise, judges an abnormal condition occurred in the device.

Case (iii)

In this case, the evaluation value X does not satisfy $X \leq (3A/2)$. In the next step, the system uses the value of (X−2A) for evaluation. If $D \leq (X-2A) \leq D$ is satisfied, the system determines that there is no abnormality, otherwise, judges an abnormal condition occurred in the device.

Here will be given more detailed explanation on the evaluation procedures above, with reference to the view illustrating the waveform of the rotators' output of FIG. 7. In the figure, the first rotator's output "M" is indicated by a wide solid line; the initial value of the second rotator's output "S0" is indicated by a narrow solid line; and the second rotator's output after characteristic change "S" is indicated by a narrow dashed line. In a real-world situation, the characteristics change may occur in a) only the first rotator's output; b) only the second rotator's output; or c) both of them. For simplicity, the explanation will be given on the condition that the second rotator's output has changes in the characteristics, while the first rotator's output has no changes.

Figure 7:
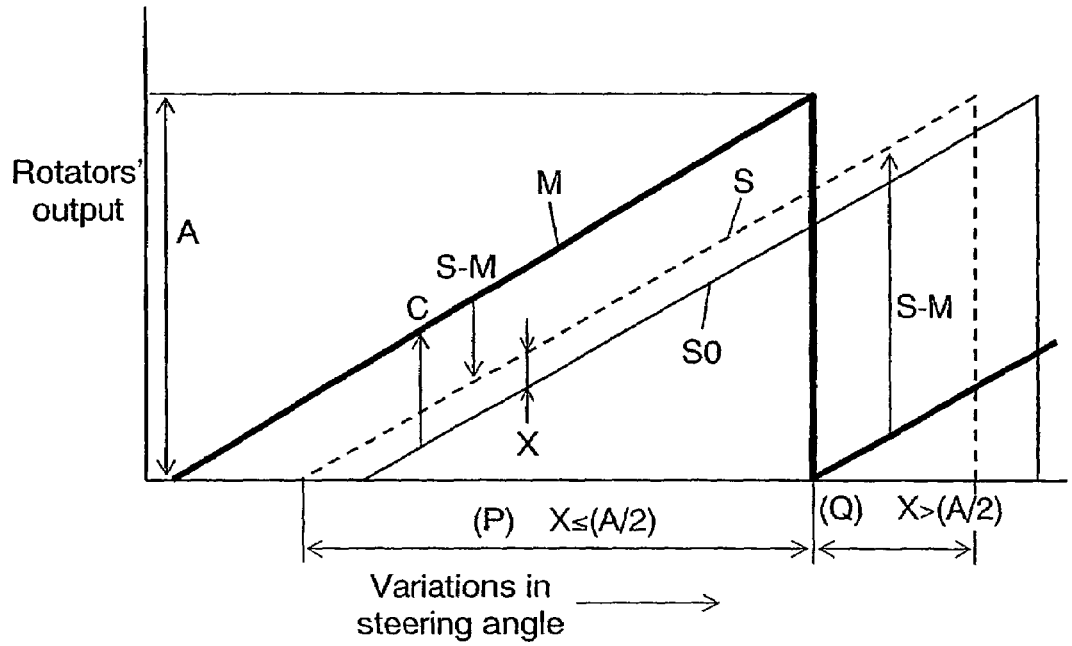
FIG. 7 is a view illustrating the relationship between the rotators' output and variations in the steering angle.

FIG. 7 shows an example in which the initial value S0 of the second rotator's output characteristically changes to the value S, with the relation in magnitude between the two outputs maintained. The value of (S−M), which represents the phase difference in driving operations, takes a negative value during the period of (P) of FIG. 7. Accordingly, the evaluation value X, which is derived from the expression: $X=|C+(S-M)|$, takes a value not more than (A/2), i.e., $X \leq (A/2)$. This explains the evaluation in the case (i) of FIG.

6. In the next step of the case (i), the evaluation value X is compared with the threshold D for evaluating abnormalities.

On the other hand, in the period (Q) of FIG. 7, the value of (S−M) takes a positive value. Accordingly, the evaluation value X becomes larger than (A/2), i.e., X>(A/2). This explains the evaluation in the cases (ii) and (iii). In each next step of the cases (ii) and (iii), the calculated evaluation value (X−A) and (X−2A) are compared with the threshold D, respectively.

Figure 8:
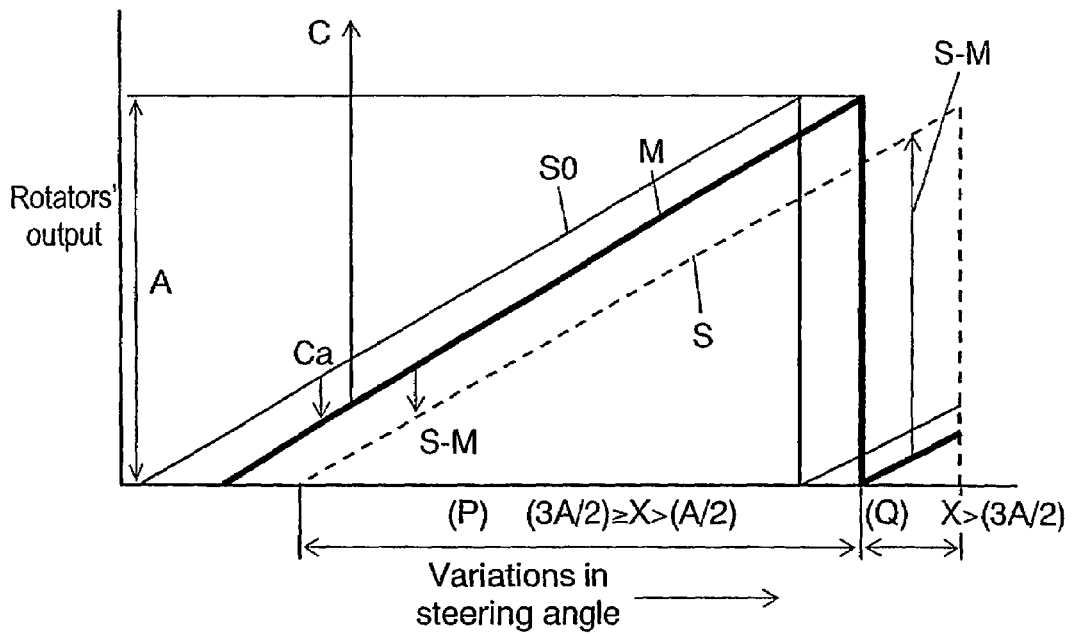
FIG. 8 is another view illustrating the relationship between the rotators' output and variations in the steering angle.

FIG. 8 shows another example in which the characteristics change from S0 to S occurred in the second rotator's output and thereby the second rotator's output S exceeds the first rotator's output M. That is, the second rotator changes its output S from the "forward" phase to "backward" phase with respect to the first rotator's output M. In this case, the average Ca takes a negative value due to the reversed relation between the two outputs. Derived from the expression (3): C=Ca+A, the initial phase difference C, as shown in FIG. 8, takes on such a large value. In the (P) period, the value of (S−M) takes a negative value. Accordingly, the evaluation value X takes a value so as to satisfy (3A/2)≧X>(A/2). On the other hand, in the (Q) period, the value of (S−M) takes a positive value. Accordingly, the evaluation value X takes a value so as to satisfy X>(3A/2). This explains the case (iii) in FIG. 6. In the next step of the case (iii), the calculated evaluation value of (X−2A) is compared with the threshold D for evaluating abnormalities.

INDUSTRIAL APPLICABILITY

The rotation-angle detecting device of the present invention can detect the rotation angle of a rotator, such as a steering wheel on an automobile, rotating beyond 360° (within a predetermined rotation range). The device, with simple calculations, can immediately detect abnormalities occurred in a rotator, a detector, an amplifier, or the like, and then accurately transmit the abnormal condition in the steering-wheel system to the control system of the car body. This realizes a highly reliable car control system, enhancing safe driving.

The invention claimed is:

1. A rotation-angle detecting device for detecting a rotation angle of a rotation detecting axle, the rotation-angle detecting device comprising:
an abnormality evaluation mechanism including:
first rotator and a second rotator, the first rotator and the second rotator having a same number of teeth and being adapted to engage with a gear fixed on the rotation detecting axle;
a first angle-detector and a second angle-detector operable to detect a rotation angle of the first rotator and a rotation angle of the second rotator, respectively; and
a controller operable to perform a calculation based on outputs from the first and second detectors and storing a result of the calculation,
wherein the controller is operable to:
convert the outputs from the first and the second detectors into a first periodic waveform and a second periodic waveform, respectively, the first periodic waveform and the second periodic waveform having a same crest value "A",
store a phase difference between the first and second periodic waveforms at a time of initial setting as an initial phase difference value "C", and
determine that an abnormal condition occurs if an evaluation value "X" calculated with reference to the initial phase difference value "C" exceeds a predetermined abnormality-evaluation threshold "D".

2. The rotation-angle detecting device of claim 1, wherein the controller is further operable to:
convert the first periodic waveform and the second periodic waveform into a first linear waveform and a second linear waveform, respectively, which linearly change as the rotation detecting axle rotates,
calculate an average value of a difference between the first and the second linear waveforms at predetermined intervals, and
determine the initial phase difference value "C" according to the calculated average value, whereby, if the average value has a positive value, the initial phase difference value "C" is the average value, and if the average value has a negative value, the initial phase difference value "C" is the sum of the average value and the crest value "A".

3. The rotation-angle detecting device of claim 1, wherein the controller is operable to obtain the evaluation value "X" by adding the initial phase difference value "C" to a difference between a value of the first periodic waveform and a value of the second periodic waveform to determine an added value, and taking an absolute value of the added value.

4. The rotation-angle detecting device of claim 3, wherein the controller is operable to determine that the abnormal condition occurred, if X≦(A/2) and X≧D are satisfied.

5. The rotation-angle detecting device of claim 3, wherein the controller is operable to determine that the abnormal condition occurred, if (A/2)≦X≦(3A/2) and (X−A)≧D are satisfied.

6. The rotation-angle detecting device of claim 3, wherein the controller is operable to determine that the abnormal condition occurred, if X≧(3A/2) and (X−2A)≧D are satisfied.

7. A rotation-angle detecting method using a rotation-angle detecting device for detecting a rotation angle of a rotation detecting axle, the rotation-angle detecting device containing:
an abnormality evaluation mechanism including:
a first rotator and a second rotator, the first rotator and the second rotator having a same number of teeth and being adapted to engage with a gear fixed on the rotation detecting axle;
a first angle-detector and a second angle-detector operable to detect a rotation angle of the first rotator and a rotation angle of the second rotator, respectively; and
a controller operable to perform a calculation based on outputs from the first and second detectors and storing a result of the calculation,
the method comprising:
converting the outputs from the first and the second detectors into a first periodic waveform and a second periodic waveform, respectively, the first periodic waveform and the second periodic waveform having a same crest value "A";
storing a phase difference between the first and second periodic waveforms at a time of initial setting as an initial phase difference value "C"; and
determining an occurrence of an abnormal condition if an evaluation value "X" calculated with reference to the initial phase difference value "C" exceeds a predetermined abnormality-evaluation threshold "D".

8. The rotation-angle detecting method of claim 7, wherein the storing operation comprises:
- converting the first periodic waveform and the second periodic waveform into a first linear waveform and a second linear waveform, respectively, which linearly change as the rotation detecting axle rotates;
- calculating an average value of a difference between the first and the second linear waveforms at predetermined intervals; and
- determining the initial phase difference value "C" according to the calculated average value, whereby, if the average value has a positive value, the initial phase difference value "C" is the average value, and if the average value has a negative value, the initial phase difference value "C" is the sum of the average value and the crest value "A".

9. The rotation-angle detecting method of claim 7, wherein the determining operation comprises obtaining the evaluation value "X" by adding the initial phase difference value "C" to a difference between a value of the first periodic waveform and a value of the second periodic waveform to determine an added value, and taking an absolute value of the added value.

10. The rotation-angle detecting method of claim 9, wherein the determining operation comprises determining the occurrence of the abnormal condition, if the evaluation value takes a value so as to satisfy $X \leq (A/2)$ and $X \geq D$.

11. The rotation-angle detecting method of claim 9, wherein the determining operation comprises determining the occurrence of the abnormal condition, if $(A/2) \leq X \leq (3A/2)$ and $(X-A) \geq D$ are satisfied.

12. The rotation-angle detecting method of claim 9, wherein the determining operation comprises determining the occurrence of the abnormal condition, if $X \geq (3A/2)$ and $(X-2A) \geq D$ are satisfied.

* * * * *